Figure 1:
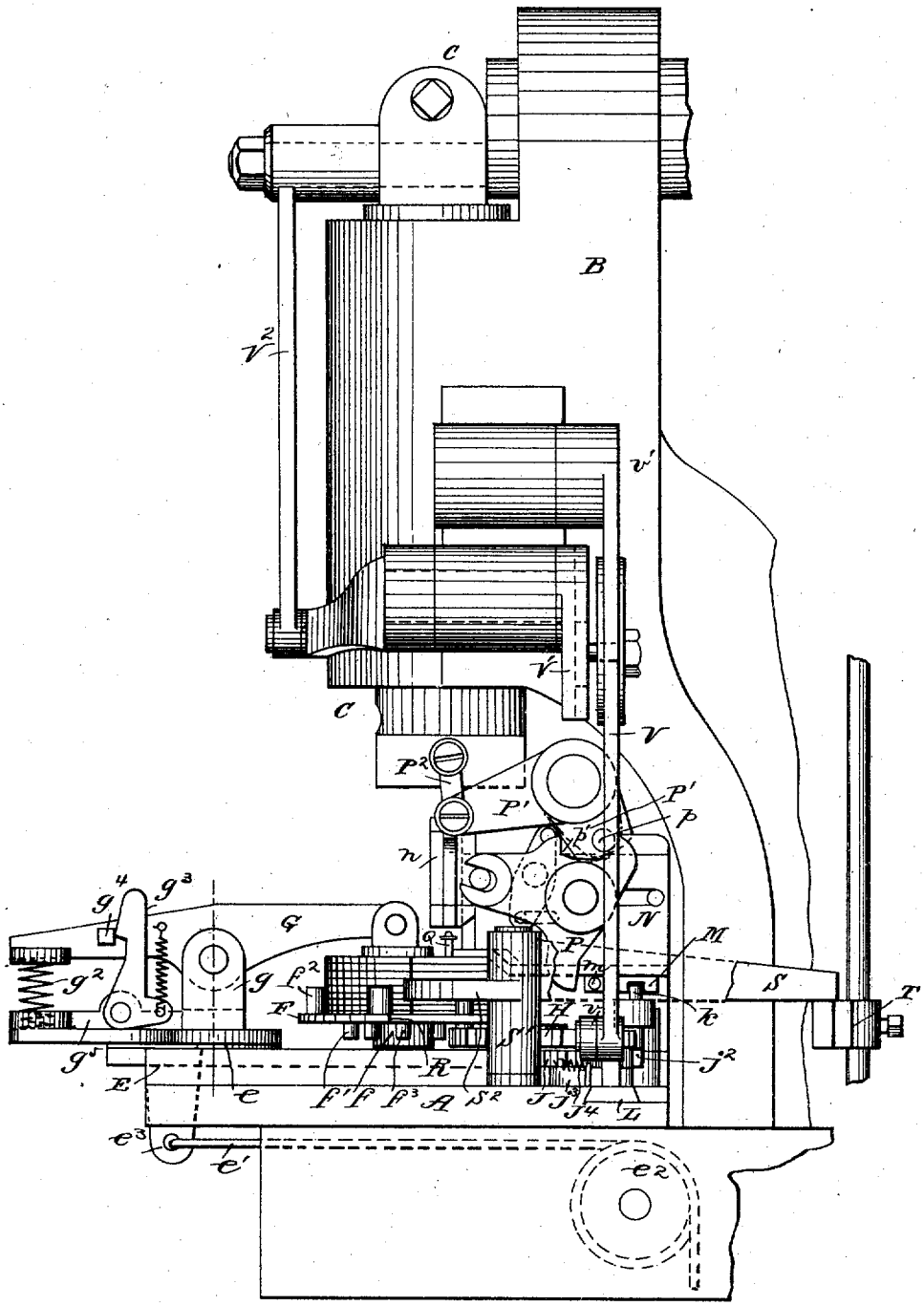

3 Sheets—Sheet 1.

E. WOODWARD.

MACHINE FOR LOADING HEELS WITH NAILS.

No. 11,486. Reissued Apr. 16, 1895.

WITNESSES.
N. E. Renick
N. E. Renick Jr.

INVENTOR
Erastus Woodward
By J. S. Rusk
Atty.

3 Sheets—Sheet 2.

E. WOODWARD.

MACHINE FOR LOADING HEELS WITH NAILS.

No. 11,486. Reissued Apr. 16, 1895.

WITNESSES.

H. E. Renick.

H. E. Renick Jr.

INVENTOR.

Ernestus Woodward

By J. L. Rock

Atty.

3 Sheets—Sheet 3.

E. WOODWARD.

MACHINE FOR LOADING HEELS WITH NAILS.

No. 11,486. Reissued Apr. 16, 1895.

WITNESSES.

K. E. Renick.

N. E. Renick Jr.

INVENTOR.

Erastus Woodward

By J. S. Rusk

Atty

UNITED STATES PATENT OFFICE.

ERASTUS WOODWARD, OF SOMERVILLE, MASSACHUSETTS, ASSIGNOR TO THE WOODWARD MANUFACTURING COMPANY, OF SACO, MAINE.

MACHINE FOR LOADING HEELS WITH NAILS.

SPECIFICATION forming part of Reissued Letters Patent No. 11,486, dated April 16, 1895.

Original No. 507,772, dated October 31, 1893. Application for reissue filed September 13, 1894. Serial No. 522,951.

*To all whom it may concern:*

Be it known that I, ERASTUS WOODWARD, of Somerville, in the county of Middlesex and State of Massachusetts, have invented a new and useful Improvement in Machines for Loading Heels with Nails, of which the following is a specification.

My invention relates to a machine by means of which nails are partly driven into a pile of heel lifts in order to form a heel blank ready to be attached by the same nails to the shoe, and it consists chiefly in certain mechanism to be hereinafter described, by means of which the heel will be fed after every nail driving operation, but will not be fed unless a nail has been driven, the nail acting to control the heel feed; and my invention also consists in means for stopping the machine when a proper number of nails have been driven.

I prefer to embody my invention as an attachment to an ordinary power press. I have shown in the drawings the plunger of such a press and prefer to combine with it a clutch mechanism like that described in Letters Patent granted to James A. Horton, No. 260,394, dated July 4, 1882, to which patent I refer for a description of the clutch mechanism, only the connections therewith being referred to herein and shown in the drawings.

Figure 5:
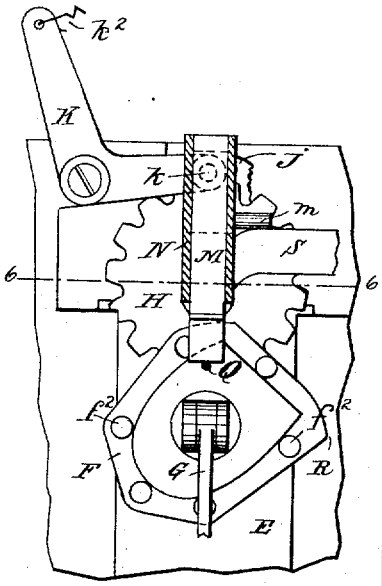
Figure 6:
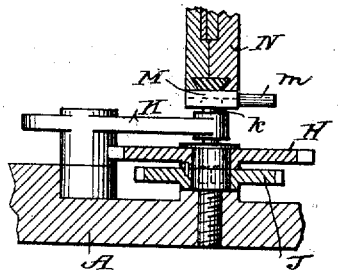
Figure 7:
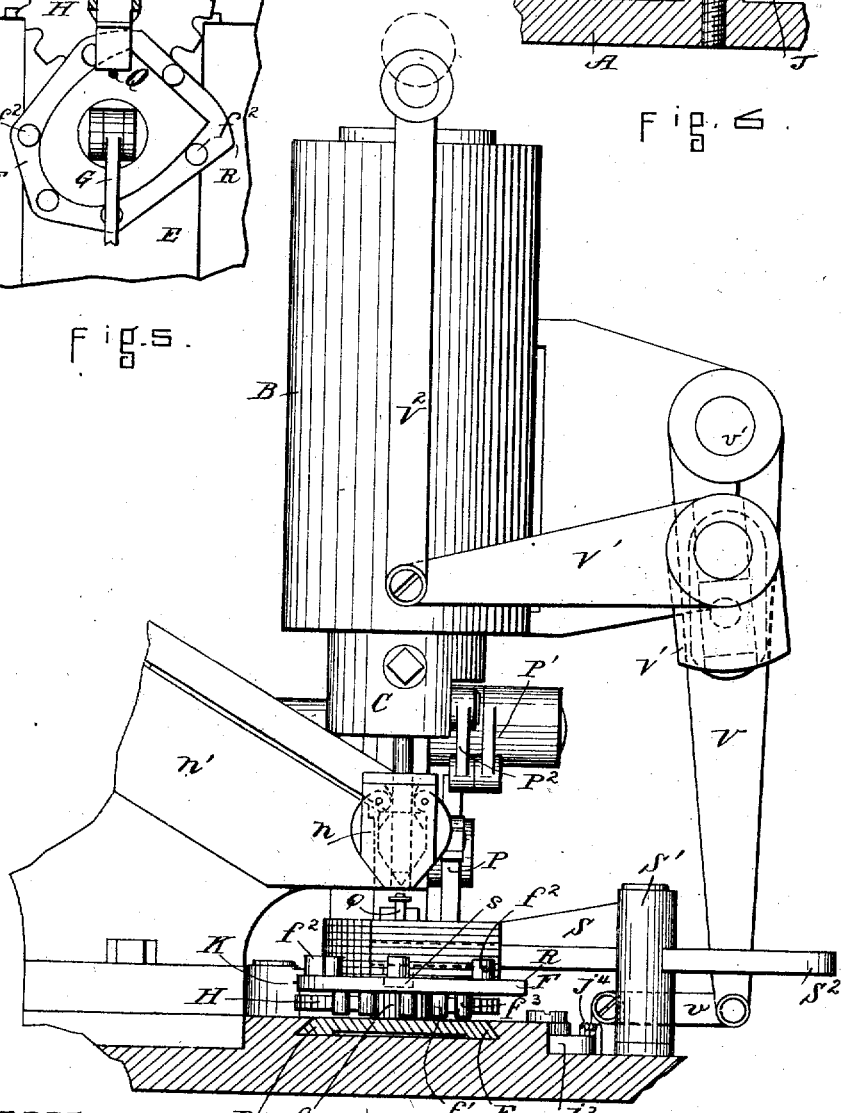
Figure 3:
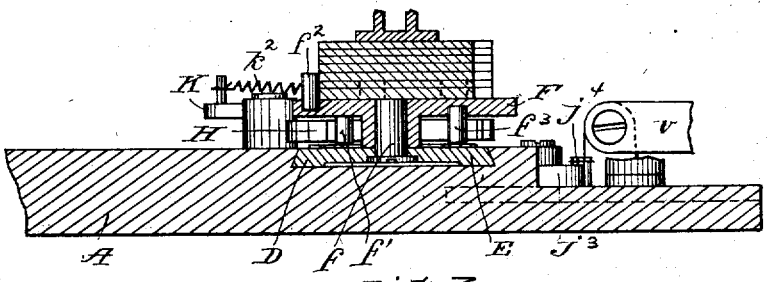
Figure 4:
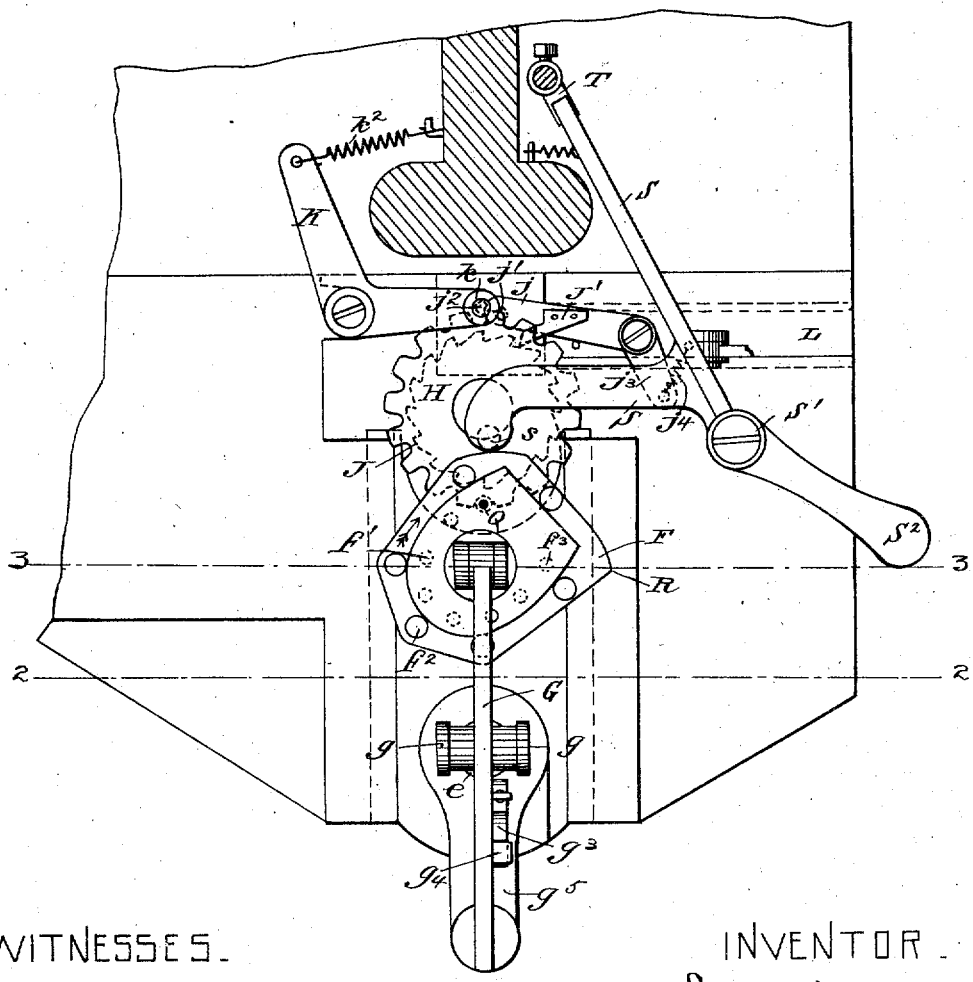

Figure 1 is a side elevation of a machine embodying my invention. Fig. 2 is a front elevation partly in section, the section being taken on line 2, 2 of Fig. 4. Fig. 3 is a detail section taken on line 3, 3 of Fig. 4, and Fig. 4 is a plan showing the heel feeding mechanism, the driver and driver connections being removed. Fig. 5 is a plan partly in section showing the feed controlling mechanism; and Fig. 6 is a section on line 6, 6 of Fig. 5.

A is the table.

B is the plunger head carrying the plunger C, which is mounted therein and carries the driver. It is reciprocated by a crank motion.

In the table A are ways D, in which runs a slide E, carrying the heel plate F, capable of rotation on an axis $f$. On the under side of this plate is a series of feed pins $f'$ adapted to engage with the feeding mechanism. A second series of pins $f^2$ project above the table and form guides between which the lifts are placed. The lifts are clamped by a clamp lever G, which is hung in supports $g$ mounted on an arm $g^5$. This arm is pivoted at $e$ in the slide E so that when the clamp is lifted to release the heel lifts, this clamp mechanism may be turned on its pivot $e$ and allow the heel to be removed. A spring $g^2$ holds the clamp against the lifts and a latch $g^3$ adapted to hook over the pin $g^4$ is provided to hold the clamp open. The slide E carrying the heel plate and clamping mechanism is pulled toward the driving mechanism by means of a weight attached to one end of the cord $e'$, running over the pulley $e^2$, the other end of this cord being attached to an eye $e^3$ projecting from the bottom of the slide E.

The heel feed consists of a pawl and ratchet mechanism which will now be described.

H is a toothed wheel mounted on a stud in the table A and adapted to engage with each of the feed pins $f'$ on this heel plate F in turn. Fast to the under side of this toothed wheel is a ratchet wheel J operated by a pawl J', carried by a lever $j$. This lever $j$ is fulcrumed on a slide L running in ways in the table A and its rear end $j^3$ is connected with the slide by the spring $j^4$, so that the pawl will normally be held in line to engage with one of the ratchet teeth and turn the ratchet.

The slide L is connected to a lever V by means of a link $v$. The lever V is fulcrumed at $v'$ and has connected to it a bell crank V' which is connected by a link $V^2$ with the plunger crank pin. This connection is such that when the plunger is being lifted, the slide L is moved forward, and vice versa. In its forward movement, the pawl J', if in its normal position, will engage with the ratchet J and turn it and the wheel H. The engagement of this wheel with one of the pins $f'$ on the bottom of the heel plate, will cause the heel plate to be fed.

The heel feed is controlled by mechanism preferably of the kind to be described, which allows a feeding operation to take place whenever a nail has been driven, and prevents the feeding of the heel when a nail has not been driven. The essentials of this mechanism as it now seems to me, are a controlling part adapted to move across the line of motion of the nail driver constructed to have its motion interrupted, if a nail has been driven, and to move freely across that line if a nail has not been driven; and also a feed mechanism adapted to feed the heel carrier, but so related to the controller that it will be rendered inoperative or not, according to the distance which the controller has moved.

N is a stationary nail feedway which carries the necessary mechanism not shown, for separating the nail in the raceway $n'$ and feeding it to the driver. Such mechanism is well known and therefore is not further described, as it forms no part of this invention, nor is any peculiar form of nail feeding mechanism necessary to a proper embodiment of this invention. This nail feedway carries on its under side a reciprocating slide M. The front end of this slide M is adapted to clear the heel (see Figs. 1 and 5) and the forward movement of this slide is sufficient in extent to cross the line of motion of the driver, and thus pass over the place where a nail should be, if no nail has been driven, this part being the controller above referred to. This slide M is connected by a pin $k$ to the bell crank K, the front end of which is thrown forward by means of the spring $k^2$ so that the tendency of the slide M is, when uncontrolled, to move forward in the direction of or across the line of motion of the driver. This slide M is withdrawn by means of the crank lever P the lower toe of which strikes against a pin $m$ projecting from the side of the controller M. The lever P has a slotted portion $p'$ in which moves the pin $p$ carried by the bell crank lever P' which gets its motion from the plunger C by means of the link $P^2$. The bell crank lever K has a pin $j^2$ projecting from its under surface acting as a cam surface in connection with a corresponding pin $j'$ mounted on the upper side of the pawl lever J, and the location of these parts is such that if the controlling slide M moves across the line of motion of the driver, the pin $j^2$ will be so located that as the pin $j'$ is carried forward by the movement of the slide L, it will pass in rear of the pin $j^2$ and consequently withdraw the pawl J' from the ratchet J and feeding mechanism, whereas if the slide M, in its forward movement, strikes a driven nail, it will so locate the pin $j^2$ that when the pin $j'$ is carried forward by the pawl slide L, it will be moved in front of the pin $j^2$ and the pawl will be caused to engage the ratchet and turn the ratchet wheel and feed wheel H, thus feeding the heel.

$n$ is the nail driveway which is moved by the front end of the lever P and slides in ways in the front of the nail feedway. It carries the pinchers shown in dotted lines in Fig. 2 and adapted to hold the nail straight when the driver first starts it.

The driver above described and above referred to, is arranged to drive nails only partly home; that is to say, so that the point of each nail is about to project through the lower surface of the lower heel lift and the upper portion or head of the nail, projects above the upper surface of the top lift as shown in the drawings.

The operation of my machine is as follows:— The parts are so timed that as the plunger rises, the slide L moves forward to feed the ratchet. Before however, the pin $j'$ has come within reach of the pin $j^2$, the slide M has been released by the bell crank P so that the spring $k^2$ will throw it forward. If a nail has been driven, it will stop when it reaches the head of the nail Q and the pin $j'$ will pass in front of the pin $j^2$ so that the pawl and ratchet will engage and the ratchet will be turned, turning the toothed wheel H and feeding the heel plate; whereas if no nail has been driven, the slide M will pass from the point where the nail should have been driven and so place the pin $j^2$ that the pin $j'$ will pass behind it and prevent contact between the pawl J' and the ratchet J. When the slide M has finished its forward movement, a nail having been placed between the pinchers in the nail feedway, the plunger begins its descent. The slide L is removed so that the slide M will be free to move back and the nail being held in place against the top of the heel lift by the pinchers, another driving operation takes place. It will be seen that as many nails will be driven in the heel as there are feeding pins $f'$, and it will also be seen that the heel plate will be turned so long as a pin $f$ lies in a depression in the wheel H, the feeding operation being in the direction indicated by the arrow in Fig. 4. When the feeding operation is finished so that the last pin, which I have marked $f^3$ comes between the teeth and the wheel H, a corner R of the heel plate will come in contact with the pin $s$ on the under side of the lever S and trip this lever so that the clutch operating mechanism T is released and the machine will stop automatically. The lever S is fulcrumed at S' and is provided with a handle $S^2$ so that the lever may be operated by hand to stop the machine.

It is obvious that my invention may be carried out in a variety of ways, the essentials being a controller and a feed mechanism capable of disengagement in the manner above described, the controller operating across the line of motion of the driver and hence operated by engagement with a driven nail to cause the feeding operation.

By means of this invention, it is possible for one operator to tend a number of machines, his work being to place the pile of lifts in position, start up the machine and leave it. At the proper times the feeding of the heel will take place and when the last nail has been driven, the stop mechanism $f^3$, $s$ will cause the machine to stop, so that the machine is perfectly automatic, so far as driving the nails and stopping when the work has been done is concerned.

What I claim as my invention is—

1. In a heel loading machine, a nail driving mechanism a heel supporting plate and a feeding mechanism, one member of which is connected with and adapted to operate said heel plate, in combination with a yielding slide, and mechanism whereby said slide is reciprocated, the front end of said slide being adapted to move across the line of motion of the nail driver, and engage with the head of a driven nail and its rear end being adapted to engage with one of the members of said feeding mechanism, as and for the purposes set forth.

2. In a heel loading machine, a nail driving mechanism, a heel plate having a series of feeding points each representing the position of a nail to be driven, a feed wheel adapted to engage with each point in turn, mechanism adapted to operate said feed wheel by a step by step motion and capable of a disengagement therefrom, and a disengaging mechanism adapted when moving uninterruptedly across the line of motion of the nail driver to cause the separation of the members of the feed mechanism, as set forth.

3. In a mechanism for feeding a heel plate, in a nailing machine a series of feeding points located on said heel plate, each adapted to engage in turn with one of the members of the feed mechanism, and a stop mechanism, one member of which is located at a fixed point the other member being located on said plate and adapted to engage with said first member when the feed mechanism has engaged with the last feeding point in the series, all as and for the purposes set forth.

4. In a heel nailing machine a heel feeding mechanism consisting of a heel plate provided on its under surface with a series of pins, each representing the position of a nail to be driven, said heel plate being mounted on a slide, and a feed wheel provided with suitable teeth adapted to engage with said heel plate, in combination with mechanism substantially as described connected with said slide and adapted to hold the pins of said heel plate in contact with said feed wheel, all as set forth.

5. In a heel nailing machine, in combination with a heel plate a clamp pivotally mounted on a frame capable of rotation, said clamp adapted to hold the heel lifts in place during the process of nailing, and on releasing said lifts, to be turned out of the way, as set forth.

6. In a heel loading machine, a heel supporting plate, a heel carried by said plate, nail driving mechanism for driving nails into the said heel, feeding mechanism for operating said heel plate after each nail has been driven, and a controller engaging with said feeding mechanism for controlling the feeding operation thereof and adapted when engaging with a driven nail to cause the operation of said feeding mechanism and heel supporting plate.

7. In a heel loading machine, a heel supporting plate, a heel carried by said plate, nail driving mechanism for driving nails into the said heel, feeding mechanism for operating said heel supporting plate after each nail has been driven, and a yielding controller engaging with said feeding mechanism for controlling the feeding operation thereof and adapted when engaging with a driven nail to cause the operation of said feeding mechanism and heel supporting plate.

8. In a heel loading machine, a heel supporting plate, having a series of feeding points located thereon, a heel carried by said plate, nail driving mechanism for driving nails into the said heel, feeding mechanism adapted to engage with said feeding points for operating said heel supporting plate after each nail has been driven, and a controller engaging with said feeding mechanism for controlling the feeding operation thereof and having a direction of travel across the line of motion of the nail driving mechanism and adapted when interrupted in its travel across said line of motion of the nail driving mechanism by engagment with a driven nail to cause the operation of said feeding mechanism and heel supporting plate.

9. In a heel loading machine, a heel supporting plate, having a series of feeding points located thereon and corresponding in number to the nails to be driven into the heel carried by said plate, nail driving mechanism for driving nails into the said heel, feeding mechanism adapted to engage with said feeding points for operating said heel supporting plate after each nail has been driven, and a controller engaging with said feeding mechanism for controlling the feeding operation thereof and having a direction of travel across the line of motion of the nail driving mechanism and adapted when interrupted in its travel across the said line of motion of the nail driving mechanism by engagement with a driven nail to cause the operation of said feeding mechanism and heel supporting plate.

10. In a heel loading machine, a heel supporting plate having a series of feeding points located thereon, a heel carried by said plate, nail driving mechanism for driving the nails into the said heel, a feed wheel adapted to engage with each point in turn, a pawl for operating said feed wheel, and a controller engaging with said pawl for controlling the engagement of said pawl and feed wheel and having a direction of travel across the line of motion of the nail driving mechanism and adapted when interrupted in its travel across the said line of motion of the nail driving mechanism by engagement with a driven nail to cause the engagement of said pawl and feed wheel and the operation of said feed wheel and heel supporting plate.

11. In a heel loading machine, a heel supporting plate having a series of feeding points located thereon and corresponding in number to the nails to be driven into the heel carried by said plate, nail driving mechanism for driving the nails into the said heel, a feed wheel adapted to engage with each point in turn, a pawl for operating said feed wheel, and a controller engaging with said pawl for controlling the engagement of said pawl and feed wheel and having a direction of travel across the line of motion of the nail driving mechanism and adapted when interrupted in its travel across the said line of motion of the nail driving mechanism by engagement with a driven nail to cause the engagement of said pawl and feed wheel and the operation of said feed wheel and heel supporting plate.

12. In a heel loading machine, a heel supporting plate having a series of feeding points located thereon, a heel carried by said plate, nail driving mechanism for driving nails into the said heel, feeding mechanism adapted to engage with each point in turn and consisting of members capable of engagement and disengagement, and a controller engaging with the feeding mechanism for controlling the engagement of the members of said feeding mechanism and having a direction of travel across the line of motion of the nail driving mechanism and adapted when interrupted in its travel across the line of motion of the nail driving mechanism, by engagement with a driven nail to cause the engagement of the said members and the operation of said feeding mechanism and heel supporting plate.

13. In a heel loading machine, a heel supporting plate, a heel carried by said plate, nail driving mechanism for driving nails into the said heel, feeding mechanism for operating said heel supporting plate, and a stop mechanism consisting of two members, one of which is located at a fixed point and the other member located on said heel plate and adapted to engage with the first member for automatically stopping the machine when the last nail has been driven.

14. In a heel loading machine, a heel supporting plate, a heel carried by said plate, nail driving mechanism for driving nails into the said heel, feeding mechanism for operating said heel supporting plate controlled in its operation by the driven nails, and a stop mechanism consisting of two members, one of which is located at a fixed point and the other member located on said heel plate and adapted to engage with the first member for automatically stopping the machine when the last nail has been driven.

In testimony whereof I have signed my name to this specification, in the presence of two subscribing witnesses, on this 31st day of August, 1894.

ERASTUS WOODWARD.

Witnesses:
H. E. REMICK,
H. E. REMICK, Jr.